May 26, 1925.
V. LINK
1,538,945
BAFFLE
Filed Oct. 5, 1923
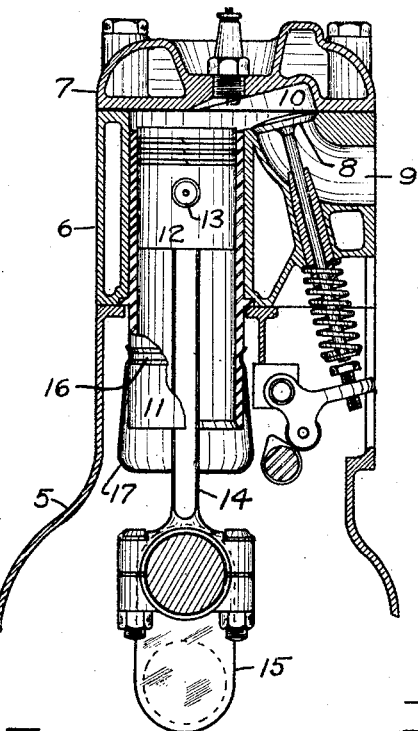
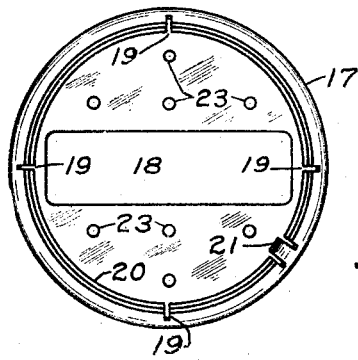
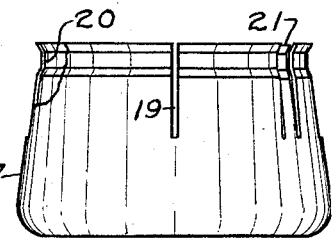
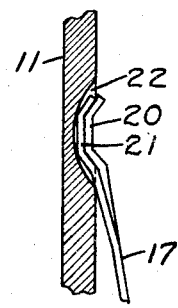
INVENTOR
VINCENT LINK
BY
*P. W. Pomeroy*
ATTORNEY Patented May 26, 1925.

1,538,945

UNITED STATES PATENT OFFICE.

VINCENT LINK, OF DETROIT, MICHIGAN, ASSIGNOR TO THE STUDEBAKER CORPORATION, OF SOUTH BEND, INDIANA, A CORPORATION OF NEW JERSEY.

BAFFLE.

Application filed October 5, 1923. Serial No. 666,852.

*To all whom it may concern:*

Be it known that I, VINCENT LINK, a citizen of the United States of America, and resident of Detroit, in the county of Wayne and State of Michigan, have invented certain new and useful Improvements in Baffles, of which the following is a specification.

This invention relates to reciprocating engines and has for its primary object the prevention of excessive lubrication of the cylinder walls.

Another object is to provide a baffle for the lower end of the cylinder, to limit the amount of lubricant thrown onto the cylinder walls.

Another object is to provide such a baffle that will have resilient engagement with the lower end of the cylinder and which may be readily attached to and removed therefrom.

A still further object is to provide such a baffle that will be simple in design, easy to construct, and will be relatively economical to manufacture.

The above, and other features which will be apparent, being among the objects of the present invention, consists of certain features of construction and combination of parts which will be described in the following specification and then claimed, reference being made to the accompanying drawings which illustrate a suitable embodiment of the same.

In the drawings:

Figure 1 is a fragmentary sectional end view of an internal combustion engine having the present invention embodied therein.

Figure 2 is a plan view of the baffle or guard member for preventing an excess of oil from entering the cylinder bore.

Figure 3 is a partially broken elevation of the baffle or guard member of Figure 2.

Figure 4 is a fragmentary sectional view of the engine cylinder liner and baffle or guard member, showing the manner in which the same are constructed to prevent turning of the latter.

In reciprocating engines, particularly of the internal combustion type, it is conventional practice to enclose the crank-shaft, connecting rods, cam-shaft, etc., in a casing or cover commonly known as a crank-case, the lubricating oil being supplied to the different bearings by a variety of different methods. In practically all cases the rotation of the crank-shaft is utilized for throwing or splashing a portion of the lubricant onto the cylinder walls to provide the proper lubrication for the piston. It often occurs that the amount of lubricant thus thrown onto the cylinder walls is excessive and if the piston or piston rings do not fit properly a portion of the lubricant may be drawn past the piston into the combustion chamber. Such a condition is known as oil-pumping and has very detrimental effects on the operation of the engine due to the fact that the lubricant thus finding its way past the piston forms a carbon deposit on the walls of the combustion chamber, on the spark plugs, and valves, due to the action of the heat of the explosions. The effects of such carbon deposits are knocking, heating up of the motor, loss of power, missings, and pitting of the valves.

Although an engine may not be subject to oil pumping, a further detrimental effect of excessive lubrication is that oil coming in contact with the underside of the head of the piston is liable to form a carbon deposit thereon. Such a condition will cause extra vibration of the engine and will decrease the acceleration thereof.

The present invention deals with means for preventing such an excess of lubrication of the piston and cylinder walls. I do this by providing a baffle or oil splash guard partially covering the end of the cylinder opening into the crank-case. I prefer to use a cup shaped member having an upper resilient edge formed to grip the lower end of the cylinder, and provided with an opening or slot in its lower face or bottom to allow for the oscillation of the connecting rod which must necessarily pass therethrough. The degree of lubrication may be varied for each cylinder as required by varying the size of the slot or adding other openings for the passage of the lubricant. It is not necessary that each cylinder of an engine be equipped with my device, but only such as require it, and the particular design of the same is such as to lend the baffle to quick adaptation and removal which makes it particularly desirable for use in this connection.

Referring to the drawings in which like numerals refer to like parts, 5 is the crank-case of an internal combustion engine having a cylinder block 6 seated thereon and closed at its upper end by a cylinder-head 7. Valves, such as 8, control the admission of combustible mixture or the emission of exhaust gas through passages such as 9 to or from the combustion chamber 10. A cylinder liner 11 extending upwardly into the cylinder block 6 and downwardly into the crank-case 5 is secured in place by a circumferential flange approximately midway of its length and is clamped between the adjacent faces of the crank-case 5 and cylinder-block 6. A piston 12 reciprocable in the liner 11 is connected by means of the piston-pin 13 to the connecting rod 14 which in turn connects it to the crank-shaft 15. The cylinder liner 11 is provided with a circumferential groove 16 in its surface at a point above its lower edge.

An oil splash guard or baffle member 17, preferably formed from thin spring-like material in a cup-shaped form with a slot 18 in its bottom and a resilient upper edge formed to fit the groove 16, is provided at the lower end of the liner 11. The slot 18 is provided for allowing the connecting rod 14 to pass therethrough and to allow for its transverse movement and may be formed to any shape or size desired so long as provision is made for the entrance and working of the connecting rod 14. Narrow vertical slots 19 are provided in the upper portion of the baffle 17 to give it resiliency so that it may be expanded over the end of the liner 11. The upper portion of the baffle 17 is provided with an inwardly extending circumferential bead or projection 20 which is formed to match the groove 16 in the liner 11. In practice the open end of the baffle 17 is sprung over the end of the liner 11 and moved upwardly until the bead 20 drops into the groove 16. The normal inner diameter of the bead 20 is preferably less than the bottom diameter of the groove 16, so that the head 20 will seat in the groove 16 under tension and will thus resist any tendency towards movement of the baffle 17 relative to the liner 11. If further provisions are desired to prevent possibilities of such a movement, inasmuch as it is essential that the length of the slot 18 remain at all times in the plane of movement of the connecting rod 14, a resilient finger such as 21, projecting inwardly further than its adjacent walls, may be formed in the upper portion of the baffle 17 by making two slots in its upper portion relatively close together and bending the intermediate material inwardly. A notch or groove such as 22, formed in the liner 11 across the circumferential groove 16, may be provided for the finger 21 to drop into, thus preventing the baffle 17 from turning on the liner 11. While I have shown and described a finger 21 formed in the baffle 17 adapted to fit in a groove 22 formed in the cylinder liner 11 to prevent movement of the baffle 17, it is obvious that other suitable means may also be employed for this purpose.

It is evident that the baffle 17 closes a substantial amount of the exposed end of the liner 11, and therefore a substantial amount of lubricant that would ordinarily be thrown onto the walls of the liner 11 is deflected by the baffle 17 and prevented from coming in contact with the same. Only the lubricant thrown or splashed up through the opening 18 may reach the cylinder walls, but if it is considered that the opening 18 is not large enough to give the desired result, it may readily be enlarged, or openings such as 23 may be provided to allow the passage of more lubricant.

It will be recognized that if the openings 23 are sufficiently small, lubricant passing therethrough will be broken up into smaller particles and into a desirable spray, either by reason of the force with which they impinge upon the sides of the opening 23, or by reason of the suction within the liner created by the piston on its upward travel.

The construction of the baffle 17 is such that it may readily be formed from sheet metal by a stamping and drawing operation, and inasmuch as no fastening means, such as bolts or screws, are necessary to attach it in place it offers a relatively economical manufacturing proposition.

Although I have shown this device in the drawings in combination with an engine having a cylinder liner 11, it is quite evident that the use of a cylinder liner is not necessary for the operation of the present invention, as the lower end of a cylinder formed integral with the cylinder block or water-jacket may readily be adapted to receive the same.

Formal changes may be made in the specific embodiment of the invention described, without departing from the spirit or substance of the broad invention, the scope of which is commensurate with the appended claims.

What I claim is:—

1. In an engine having a cylinder, a piston, a crank shaft, and a connecting rod connecting said piston and crank shaft, an oil baffle comprising a cup-shaped member having resilient sides adjacent the open end forming the attaching means of said member to said cylinder, and an opening in the closed end of said member for the passage of said connecting rod.

2. The combination with a cylinder, a piston, a connecting rod, and a crank-shaft, of an oil-baffle for an end of said cylinder, said oil-baffle comprising a cup-shaped member split adjacent the open end to give resiliency thereto in a radial direction, and whose closed end is provided with an opening for the passage and working of said connecting rod.

3. The combination with a cylinder, a piston, a connecting rod, and a crank-shaft, of an oil-baffle adapted to partially close an open end of said cylinder, said oil-baffle comprising a cup-shaped member inserted over the end of said cylinder and resiliently retained thereon, and an opening in the bottom thereof for permitting said connecting rod to work therein.

4. In an engine, the combination of a crank-case, a cylinder having a free end projecting within said crank-case, and an oil-baffle for limiting the exposed end area of said cylinder, said baffle comprising a cup-shaped member inserted over the free end of said cylinder and resiliently supported on said cylinder.

5. In an engine, the combination of a crank-case, a cylinder having a free end projecting within said crank-case, and an oil-baffle for limiting the exposed end area of said cylinder, said baffle having resilient engagement with said cylinder; and resilient means for preventing longitudinal displacement of said baffle with respect to said cylinder.

6. In combination, a cylinder, a cylinder liner, a piston reciprocable within said cylinder liner, a crank-shaft, a connecting rod pivotally connecting said piston to said crank-shaft, and an oil-baffle positioned between said piston and said crank-shaft; said oil-baffle resiliently engaging and being supported by said cylinder liner.

7. In an engine, a cylinder provided with a free end projecting into a crank-case, and further provided with a circumferential groove in the outer surface of said projecting end; and an oil-baffle for the said projecting end of said cylinder, said baffle comprising a cup-shaped member provided with resilient means for engaging said circumferential groove in said cylinder.

8. The combination with a cylinder, a connecting rod, and a crank-shaft, of an oil-baffle for an end of said cylinder comprising a cup-shaped member split for a portion of its length adjacent its open end to give radial resiliency thereto, an opening in the closed end for the passage and working of said connecting rod and for the passage of oil, and other openings in the closed end for the passage of oil.

9. A cylinder having an open end and a circumferential groove in the outer surface adjacent said end, and a cup-shaped member adapted to resiliently engage said cylinder, said cup-shaped member being provided with an inwardly projecting circumferential portion adjacent its open end, and slots extending transversely across said projecting part, said projecting part being adapted to engage said groove in said cylinder, and means for preventing rotation of said cup-shaped member about said cylinder.

10. The combination with a cylinder, a connecting rod, and a crank-shaft, of a cup-shaped oil-baffle for an end of said cylinder, said oil-baffle having a slot in its closed end for the passage of said connecting rod and for allowing oscillation thereof, the portion adjacent the open end of said cup-shaped baffle being split to give resiliency thereto in a radial direction, and a resilient finger formed in said portion for engaging a notch in said cylinder for preventing said cup-shaped member from turning thereon.

Signed by me at Detroit, Michigan, U. S. A., this 2nd day of October, 1923.

VINCENT LINK.

Witnesses:
HODGSON S. PIERCE,
DONALD B. WAITE.